(No Model.) 2 Sheets—Sheet 2.
M. C. EGAN.
COMBINED SEEDER AND GANG PLOW.
No. 471,050. Patented Mar. 15, 1892.
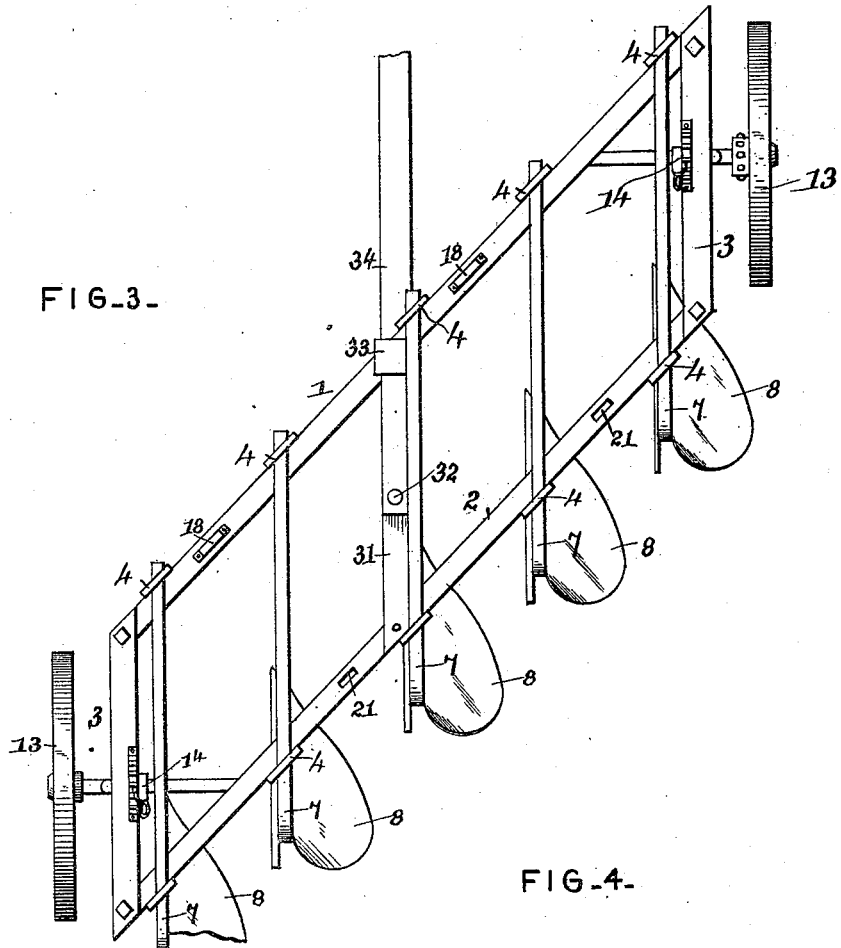
FIG-3-
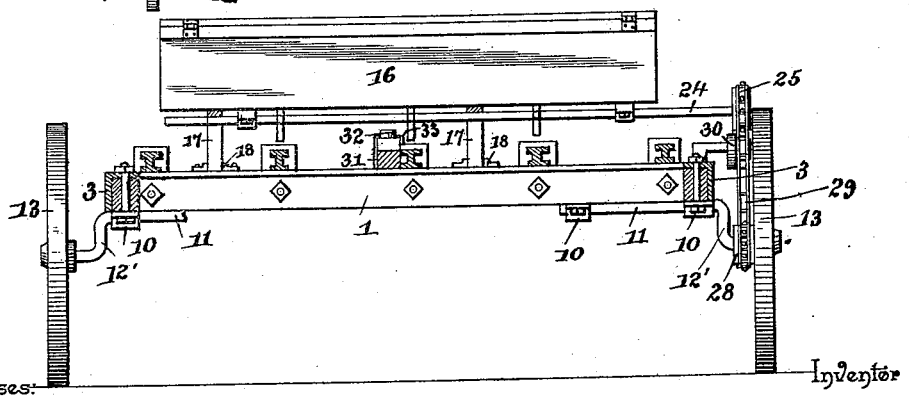
FIG-4-
Witnesses: Jas. K. McCathran, W. S. Duvall
Inventor M. C. Egan
By his Attorneys, C. A. Snow & Co.

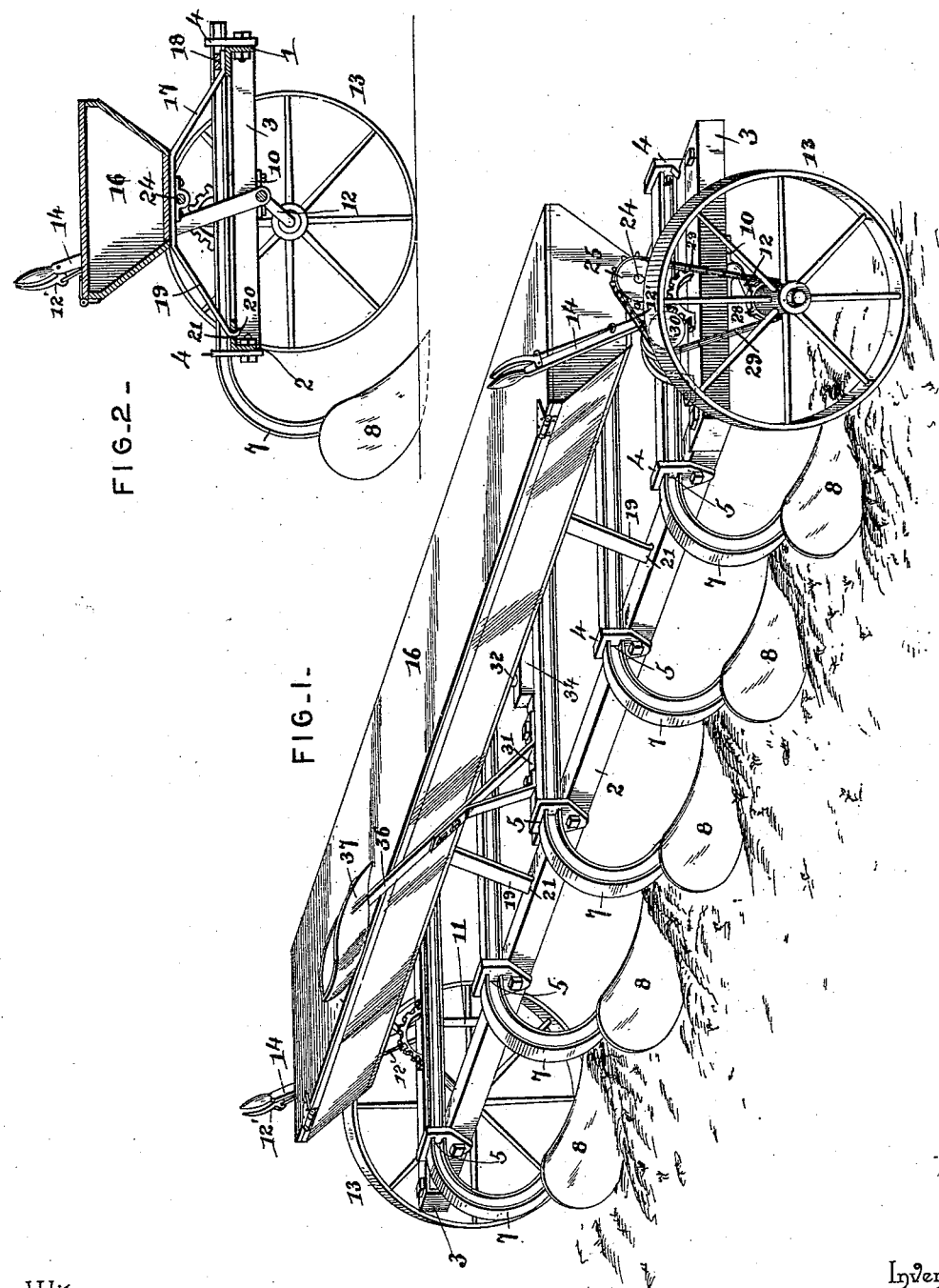

UNITED STATES PATENT OFFICE.

MICHAEL C. EGAN, OF NORTH LA CROSSE, WISCONSIN.

COMBINED SEEDER AND GANG-PLOW.

SPECIFICATION forming part of Letters Patent No. 471,050, dated March 15, 1892.

Application filed September 14, 1891. Serial No. 405,667. (No model.)

*To all whom it may concern:*

Be it known that I, MICHAEL C. EGAN, a citizen of the United States, residing at North La Crosse, in the county of La Crosse and State of Wisconsin, have invented a new and useful Seeder, of which the following is a specification.

This invention relates to improvements in combined plows and seeders; and the objects in view are to provide a machine of the above character adapted to be used as a plow and seeder or separately as a plow and to be especially adapted for work upon uneven ground.

A further object is to combine strength, lightness, and simplicity in the general make-up of the implement.

Further objects and advantages of the invention will appear in the following description, and the novel features thereof will be particularly pointed out in the claims.

Referring to the drawings, Figure 1 is a rear perspective of a machine constructed in accordance with my invention. Fig. 2 is a transverse section. Fig. 3 is a plan view, the seed-box removed. Fig. 4 is a longitudinal section.

Like numerals of reference indicate like parts in all the figures of the drawings.

In constructing my machine I form of light angle-iron a rhomboid-shaped frame, the same consisting of the front bar 1, the rear bar 2, and the opposite end bars 3. The front and rear bars 1 and 2 are provided, parallel to the end bars 3, with pairs of casting-plates 4, securely bolted to said bars, and said plates are provided above the bars with oblong slots or openings 5, each pair of which receives a goose-neck-shaped plow-beam 7, the rear ends of which, as the name would indicate, are curved and terminate in shovels or plows 8. By reason of the shape of the frame-work it will be seen that the plows are arranged one in advance of the other and at an angle to the line of draft. Bearings 10 are formed at the acute angles at opposite ends of the frame, and in each pair of bearings an axle 11 is journaled for rotation. The axles at their outer ends terminate in cranks 12, and each accommodates loosely a ground-wheel 13. From the axles extend levers 14, which may be swung to the front or rear, thus turning or rotating partially the axles, and consequently raising or lowering the frame and plows. These levers may be locked in any desired position or points of adjustment by means of spring-pawls 12', engaging with toothed sectors located upon the frame-work, and in this manner the frame-work and plows may be raised and lowered to and from the ground. By reason of the shape of the frame-work it will be seen that one wheel will travel in advance of the other and that the machine is especially adapted for uneven ground.

16 designates a seed-hopper that may be used in connection with the gang-plow just described, and the same is of rhomboid shape, or, in other words, corresponds with the shape of the frame-work. The hopper may be permanently secured to the frame-work, but in this instance is removably secured and in the following manner: A pair of standards 17 extend from the bottom of the hopper forwardly and at their extremities are bent to removably engage with keepers 18, secured to the front bar of the frame-work. Rear standards 19 extend rearwardly from the hopper and at their lower extremities are reduced and bent to form hooks 20 for engaging openings 21, formed in the rear bar of the frame-work. By such construction it will be obvious that the seed-hopper may be connected with or removed from the machine at pleasure. An agitator-shaft 24 passes through the hopper from end to end thereof and at its advance end carries a sprocket-wheel 25, which sprocket-wheel is operated by means of the advance ground-wheel, to the toothed hub 28 of which it is connected by a sprocket-chain 29. The sprocket-chain is guided by an ordinary flanged guide-pulley 30, secured to one side of the machine. A draft-bar 31 connects the front and rear bars of the frame-work and is provided with a perforation, through which a pin 32 is passed. At the front of the draft-bar a loop 33 is located upon the front bar 1, and a draft-pole 34 passes through the loop and is coupled to the draft-bar by the pin just mentioned.

36 designates a seat-standard, which rises from the frame and supports a seat 37, adapted to support the driver between and within convenient reach of the two frame-elevating levers.

In operation the machine is first transported to the field, the levers being manipulated so as to elevate the frame and the plows from the ground. After reaching the field the plows are lowered to the desired depth and the machine started. Motion is imparted from the ground-wheel to the agitator of the seed-hopper, and as the seed is scattered broadcast it is covered by the shovels following thereafter. It will be seen that a machine thus constructed has great efficiency and capacity, and that by removing the seed-hopper the machine may be used as an ordinary gang-plow. By increasing or decreasing the number of casting-plates and the plow-beams the capacity of the machine as a whole may be increased or diminished.

Having described my invention, what I claim is—

1. In a machine of the class described, the combination, with the rhomboid-shaped metal frame having the plows and ground-wheels, the front bar of the frame being provided with orifice-keepers and the rear bar with openings, of the rhomboid-shaped hopper having front and rear standards bent to engage the keepers and openings of the frame, substantially as specified.

2. In a machine of the class described, the combination, with the frame of light angle-iron comprising front and rear bars, of the front and rear cast-metal plates having openings and bolted opposite each other to said bars, and the plow-beams formed of angle-iron and fitting the openings of the plates, substantially as specified.

In testimony that I claim the foregoing as my own I have hereto affixed my signature in the presence of two witnesses.

MICHAEL C. EGAN.

Witnesses:
  E. B. RYNNING,
  OTTO TUNBY.